INVENTORS
JAMES L. BREDIGER
WILLIAM B. DAY
LOUIS J. LAVEDAN, JR.
JOE K. PARKS
BY

ATTORNEY

INVENTORS
JAMES L. BREDIGER
WILLIAM B. DAY
LOUIS J. LAVEDAN, JR.
JOE K. PARKS
BY
S C Yeaton
ATTORNEY INVENTORS
JAMES L. BREDIGER
WILLIAM B. DAY
LOUIS J. LAVEDAN, JR.
JOE K. PARKS
BY
S C Yeaton
ATTORNEY United States Patent Office 3,431,515
Patented Mar. 4, 1969

1

3,431,515

MICROWAVE TRANSITION APPARATUS

James L. Brediger, Clearwater, William B. Day, Dunedin, Louis J. Lavedan, Jr., Clearwater, and Joe K. Parks, Dunedin, Fla., assignors to Sperry Rand Corporation, a corporation of Delaware Filed May 11, 1966, Ser. No. 549,411
U.S. Cl. 333—21 11 Claims
Int. Cl. H01p 1/16, 1/00

ABSTRACT OF THE DISCLOSURE

Microwave transition apparatus for coupling a transmission line having a center conductor to a dielectrically loaded wave-guide, the apparatus including dielectric means shaped and dimensioned to match the impedances of the line and waveguide and provide an asymmetrical load therebetween for transforming a TEM mode propagating in the line to a dominant TE mode for propagation in the waveguide and conversely.

This invention relates to microwave energy transforming devices and more particularly to apparatus for transferring microwave energy from a transmission line to a dielectrically loaded waveguide.

Heretofore various means have been disclosed for transforming a TEM mode propagating in a coaxial or strip transmission line to a $TE_{10}$ mode propagating in a hollow rectangular waveguide. The present invention is concerned with means for transforming a microwave transmission line TEM mode to the dominant TE mode of a dielectrically loaded waveguide. More specifically, the invention relates to means for transforming a TEM mode propagating in a double ground plane strip transmission line, hereinafter referred to as strip transmission line, to a $TE_{10}$ mode propagating in a rectangular waveguide and to means for transforming a TEM mode propagating in a coaxial transmission line to a $TE_{11}$ mode propagating in a circular waveguide. In each instance the $TE_{10}$ or $TE_{11}$ mode is modified slightly from the corresponding dominant mode of a hollow waveguide in that most of the mode power is concentrated in the loaded portion of the waveguide. The invention has utility with any symmetrically disposed dielectric load which in an electronically scanned radar, for example, may be a ferrite phase shifter constructed of garnet or other ferrimagnetic material.

Electronically scanned radars generally include a plurality of phase shifting elements each comprising several gyromagnetic members symmetrically positioned along the longitudinal axis of a rectangular waveguide. External driving means control the magnetization of the gyromagnetic members, which are customarily toroidal cores having a rectangular cross-section and a square hysteresis loop magnetization characteristic, whereupon the state of their magnetization regulates the propagation constant of the electromagnetic energy propagating in the waveguide. Since the bandwidth of a waveguide is increased when toroidal cores are inserted in it, a waveguide of specified dimensions is able to propagate a lower frequency than it could in the absence of the cores, or alternatively for a specified operating frequency the waveguide dimensions may be reduced when the phase shifter elements are inserted. The capability of using smaller waveguides is particularly significant in electronically scanned radars since the scanning angle is maximized when the center-to-center spacing of the individual phase shifting elements is approximately half the wavelength of the electromagnetic energy radiated by the system. Various methods have been employed for coupling the

2 electromagnetic energy to the phase shifting elements. Two basic categories are the confined coupling and the space or optical coupling. In confined coupling systems the energy is enclosed within the structure of a waveguide, coaxial cable or strip transmission line. In order to retain the advantage of smaller cross-section which accrues from inserting a phase shifting element in the waveguide, it is essential that the energy be transferred from the confined coupling means to the phase shifting section with a transition device having cross-sectional dimensions no larger than those of the loaded waveguide.

In certain applications the microwave energy is most conveniently transmitted from one location to another by means of flexible coaxial transmission line. In such cases, often the coaxial transmission line TEM mode has been transformed to a dominant TE mode for application to a device such as a phase shifter, it is necessary to transform the dominant TE mode back to a TEM mode for further transmission in the coaxial line. This capability is obtained with the present invention by placing two of the microwave transition devices in back-to-back relation at each end of the phase shifter.

One of the principal objects of the present invention, therefore, is to provide a microwave transition for transforming a TEM mode propagating in a microwave transmission line to a dominant TE mode propagating in a dielectrically loaded waveguide.

Another object of the invention is to provide a microwave transition for transforming a TEM mode propagating in a coaxial transmission line to a $TE_{11}$ mode propagating in a dielectrically loaded circular waveguide.

Another object of the invention is to provide a microwave transition device of the immediately aforesaid type having a reciprocal characteristic for transforming a $TE_{10}$ mode of a dielectrically loaded rectangular waveguide to a TEM mode of a strip transmission line.

Another object of the invention is to provide a microwave transition for transforming a TEM mode propagating in a coaxial transmission line to a $TE_{11}$ mode propagating in a dielectrically loaded circular waveguide.

Another object of the invention is to provide a microwave transition device of the immediately aforesaid type having a reciprocal characteristic for transforming a $TE_{11}$ mode of a dielectrically loaded circular waveguide to a TEM mode of a coaxial transmission line.

A further object of the invention is to provide a microwave transition from transmission line to dielectrically loaded waveguide with a low voltage standing wave ratio in a small structure having cross-sectional dimensions no larger than the corresponding dimensions of the waveguide and a maximum length approximately equal to the wavelength of the electromagnetic energy being transformed.

These and other objects of the invention, as will appear from a reading of the following specifications, are accomplished by a transition device which provides not only impedance matching of a transmission line and a dielectrically loaded waveguide, but also asymmetrical loading of the transmission line. Asymmetrical loading of the transmission line is accomplished by using dielectric materials of different dielectric constant in the upper and lower portions of the line to change the phase of the electric fields propagating therein by 180 degrees relative to each other. As a result, the electric fields which are 180 degrees out-of-phase in the upper and lower portions of the transmission line are brought into phase after propagating from the transmission line through the transition device into the loaded waveguide. For propagation in the opposite direction the dominant TE waveguide mode is divided into two modes which are differentially phase shifted by 180 degrees relative to each other to propagate as a TEM mode in the strip or coaxial transmission line.

For a more complete understanding of the present invention reference should be made to the following detailed specification and the accompanying drawings wherein:

FIG. 1 is a perspective illustration, partly broken away, showing one embodiment of a microwave transition for transforming a strip transmission line TEM mode to a rectangular waveguide $TE_{10}$ mode;

FIGS. 2*a* through 2*d* are cross-sectional views taken at different positions along the structure of FIG. 1 illustrating the electric field patterns at the respective cross-sections;

Figure 1:
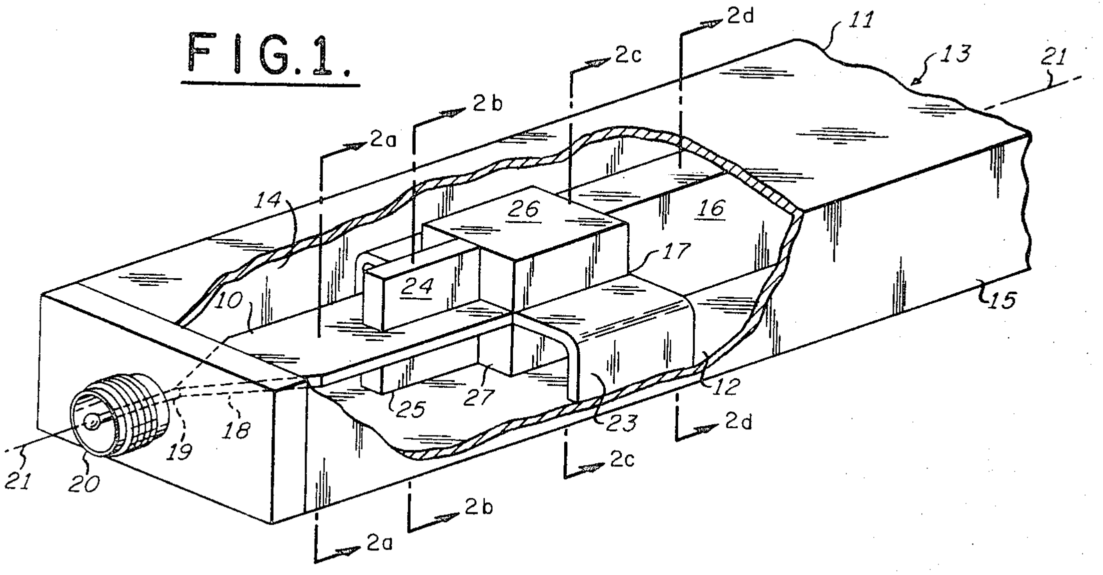

Referring to FIG. 1, a double ground plane strip transmission line is formed by conductor strip 10 and the broadwalls 11 and 12 of rectangular waveguide 13. Narrow walls 14 and 15 of waveguide 13 provide support for the strip transmission line elements but other support means may be used since rectangular waveguide is required only to enclose the rectangular cross-sectioned dielectric load 16 beyond the strip transmission line termination 17. The tapered end 18 of conductor strip 10 connects with the inner conductor 19 of coaxial line 20 to provide a microwave transition wherein a TEM mode propagating in the coaxial line is transferred to the strip transmission line. The dielectric load 16 is symmetrically positioned along the longitudinal axis 21 within waveguide 13. A microwave transition device, consisting of a septum 23 and dielectric members 24 and 25 and dielectric blocks 26 and 27 having longitudinal axes parallel to the longitudinal axis 21 of waveguide 13, abuts the dielectric load 16 at the strip transmission line termination 17. Septum 23 is formed by widening conductor strip 10 to the full width of waveguide 13. Although a U-shaped septum is shown supported on broadwall 12, a flat septum connected to narrow walls 14 and 15 by welding or other suitable support means may also be used. The dielectric members 24 and 25 and dielectric blocks 26 and 27 have rectangular cross-sections and are symmetrically disposed within the waveguide on opposite sides of the conductor strip 10 and septum 23 such that the longitudinal axes of the members, blocks and waveguide lie in a plane parallel to the narrow walls 14 and 15.

Figure 2A:
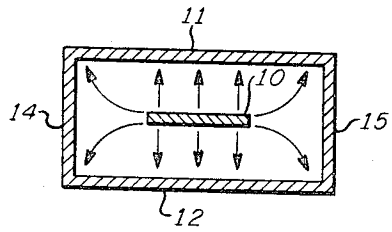
Figure 2B:
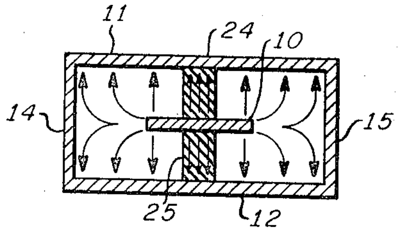
Figure 2C:
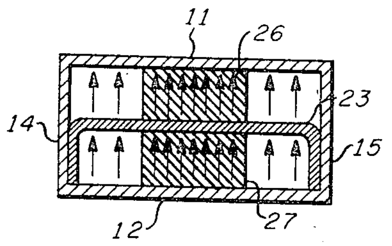
Figure 2D:
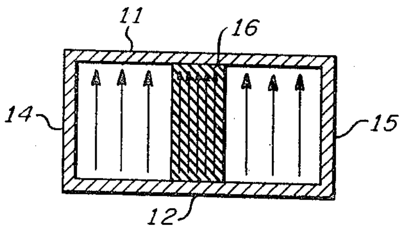

The electric field at section **2*a*—2*a*** on the unloaded strip transmission line forms a TEM mode as shown in FIG. 2*a*. The dielectric members 24 and 25, which are preferably, but not necessarily, identical in size, shape and dielectric constant, provide an impedance match between the strip transmission line and the septate portion of the microwave transition device causing the electric field at section **2*b*—2*b*** of the strip transmission line to be modified as shown in FIG. 2*b* with the power concentrated in the dielectric members. The dielectric blocks 26 and 27 have substantially the same shape but different dielectric constants so that they asymmetrically load the upper and lower halves of the strip transmission line. The length and width of the dielectric blocks and the relative value of their dielectric constants are selected to produce a relative phase shift of 180 degrees between the electric fields propagating in each half of the septate region. As a result the electric fields which were 180 degrees out-of-phase upon entering the septate region are adjusted to be in-phase at section **2*c*—2*c* at the termination 17** of the septate region as shown in FIG. 2*c*. The septate portion of the microwave transition device also provides an impedance match between the dielectric member section and the dielectrically loaded rectangular waveguide. When the electric fields propagate beyond the septate region into the abutting dielectrically loaded waveguide, they combine to form the dominant $TE_{10}$ mode configuration of a rectangular waveguide and have a pattern at section **2*d*—2*d*** as depicted in FIG. 2*d*.

Figures 3, 4:
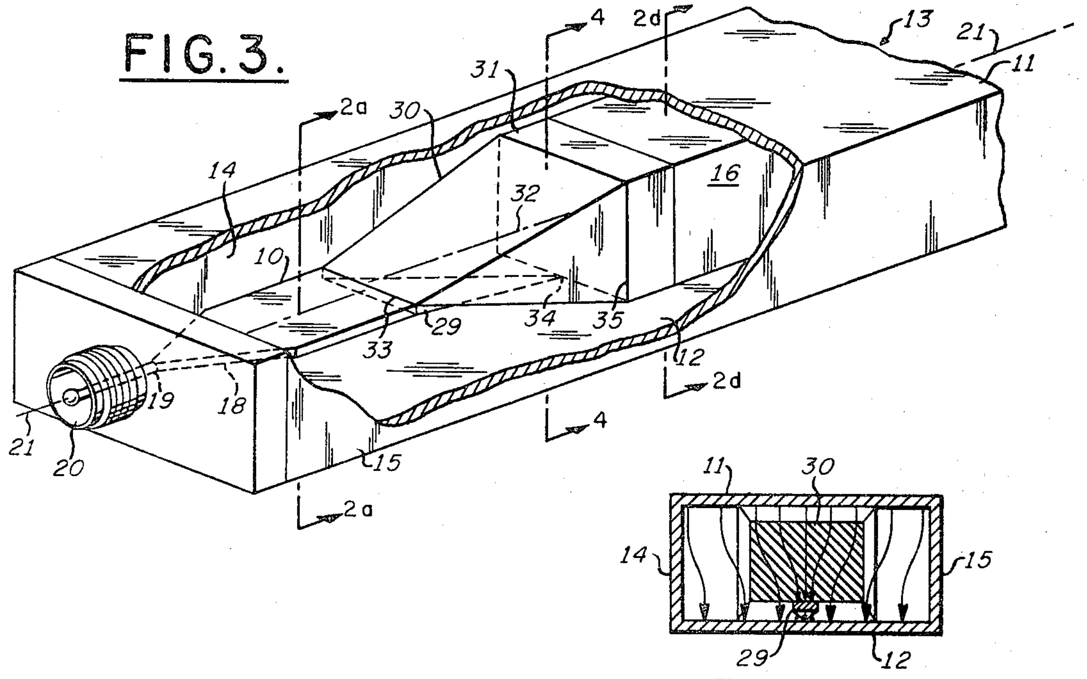
FIG. 3 is a perspective illustration, partly broken away, showing a second embodiment of the microwave transition for transforming a strip transmission line TEM mode to a rectangular waveguide $TE_{10}$ mode.
FIG. 4 is a cross-section view taken at section 4—4 of FIG. 3 illustrating the electric field pattern thereat.

Refer now to FIG. 3 wherein the only difference from FIG. 1 is in the microwave transition device which consists of a canted extension 29 of conductor strip 10, a dielectric segment 30 and a dielectric block 31. Dielectric segment 30, which is aligned with its longitudinal axis 32 parallel to the longitudinal axis 21 of waveguide 13, is tapered with respect to broadwalls 11 and 12 and narrow walls 14 and 15. The taper with respect to the broadwalls is from the highth dimension of dielectric block 31 to a fine edge 33 and the taper with respect to the narrow walls is from the width dimension of dielectric block 31 to the width dimension of conductor strip 10 at fine edge 33. The canted extension 29 is tapered with respect to the narrow walls from the width of conductor strip 10 at fine edge 33 to substantially a point 34 and has a slant corresponding to the highth taper of dielectric segment 30 so that point 34 meets broadwall 12 at the interface 35 between dielectric segment 30 and dielectric block 31.

Dielectric block 31 functions as an impedance matching element between the strip transmission line termination at interface 35 and the dielectric load 16. The dielectric segment 30 in conjunction with the canted extension 29 matches the impedance of the unloaded strip transmission line at section **2*a*—2*a* with the dielectric block 31. Dielectric segment 30 also asymmetrically loads the strip transmission line to produce a relative phase shift of 180 degrees between the electric fields propagating in the strip transmission line sections above and below the canted extension 29. The length and dielectric constant of dielectric segment 30 are selected so that the electric fields which were 180 degrees out-of-phase at section 2*a*—2*a* are adjusted to be in-phase at the instant they propagate through interface 35. FIG. 4 depicts the electric field pattern at section 4—4 immediately before the wave passes through interface 35. Upon propagating into dielectric block 31 and dielectric load 16** the electric field assumes the dominant $TE_{10}$ mode configuration of a rectangular waveguide.

Figure 5:
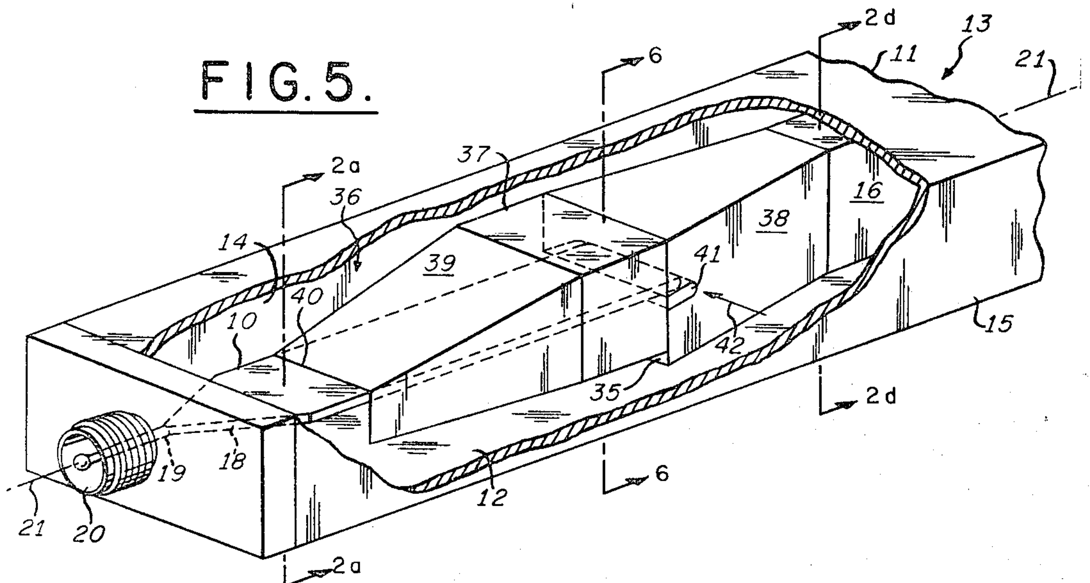
FIG. 5 is a perspective illustration, partly broken away, showing a third embodiment of the microwave transition for transforming a strip transmission line TEM mode to a rectangular waveguide $TE_{10}$ mode.

Refer now to FIG. 5 wherein again the only difference from FIG. 1 is in the microwave transition device consisting of the U-shaped section 36, U-shaped section 37 and slotted section 38. The U-shaped sections 36 and 37 are mounted so as not to be in contact with the broadwall 12. U-shaped section 36 is tapered symmetrically along longitudinal axis 21 with respect to narrow walls 14 and 15 from the width dimension of U-shaped section 37 to the width dimension of conductor strip 10. The base portion 39 of U-shaped section 36 is tapered with respect to the broadwall 11 from a highth equal to the distance between the top of conductor strip 10 and the top of U-shaped section 37 to a fine edge 40 at the interface between conductor strip 10 and U-shaped section 36. Slotted section 38 is also tapered symmetrically along longitudinal axis 21 with respect to the narrow walls 14 and 15 from the width dimension of U-shaped section 37 to the width dimension of load 16. Slot 41 extends across the width of slotted section 38 on a line perpendicular to the narrow walls and terminates in a semi-circular cross-section, viewed in the direction of arrow 42, to accommodate a similarly contoured termination of conductor strip 10 for the purpose of reducing reflections at the interface of the conductor strip and slotted section 38. Although a slot extending the full width of section 38 was used in the construction of this embodiment of the microwave transition, it should be understood that a slot centrally located on longitudinal axis 21 but not extending the full width of slotted section 38 may also be used.

Figure 6:
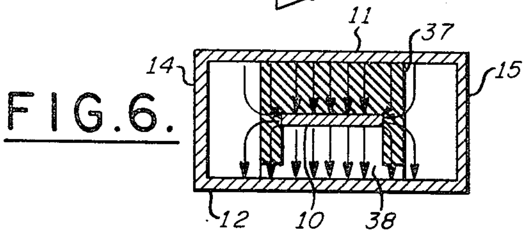
FIG. 6 is a cross-sectional view taken at section 6—6 of FIG. 5 illustrating the electric field pattern thereat.

Slotted section 38 matches the impedance of U-shaped section 37 with the dielectric load 16. U-shaped section 36 provides an impedance match between the U-shaped section 37 and the unloaded strip transmission line at section *2a*—*2a*. The length and dielectric constants of the U-shaped sections 36 and 37, which asymmetrically load the strip transmission line, are selected to produce a relative phase shift of 180 degrees between the electric fields propagating in the upper and lower portions of the strip transmission line. As a result the TEM mode propagating at section *2a*—*2a* as shown in FIG. *2a* is converted at section 6—6 to the mode pattern shown in FIG. 6 which in turn becomes the modified $TE_{10}$ dominant rectangular waveguide mode of FIG. *2d* when the wave propagates beyond the end of slot 41 to section *2d*—*2d*.

Figure 7:
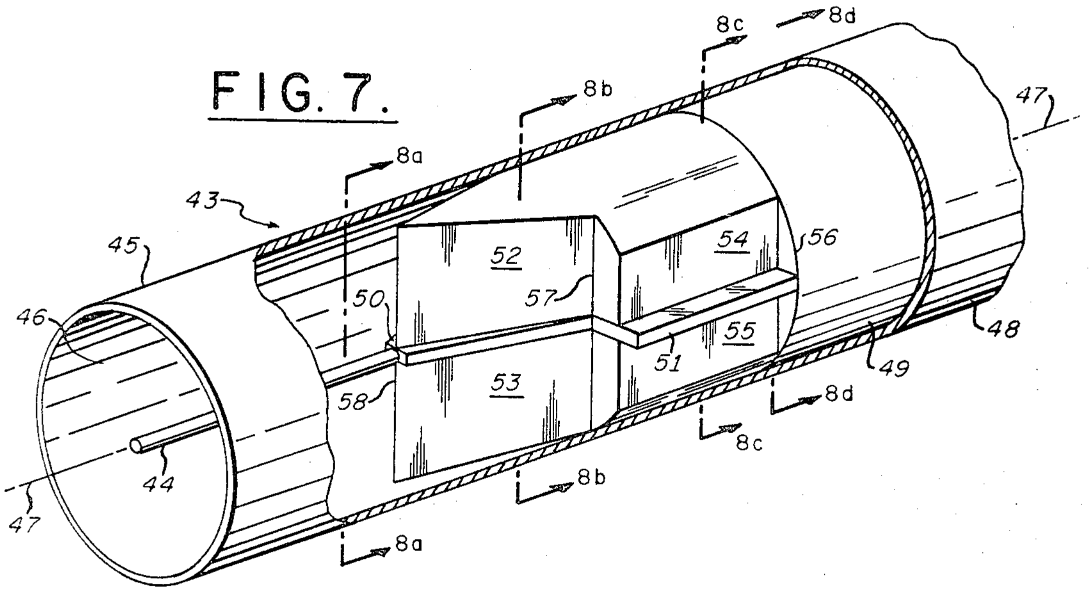
FIG. 7 is a perspective illustration, partly broken away, showing an embodiment of a microwave transition for transforming a coaxial transmission line TEM mode to a circular waveguide $TE_{11}$ mode.
Figure 8A:
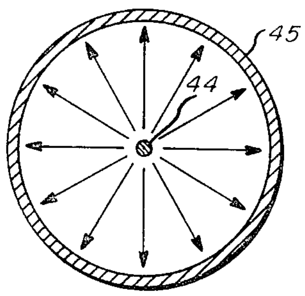
FIGS. 8*a* through 8*d* are cross-sectional views taken at different positions along the structure of FIG. 7 illustrating the electric field pattern thereat.
Figure 8B:
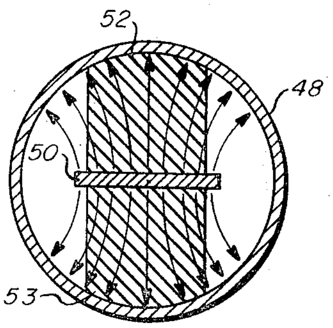
Figure 8C:
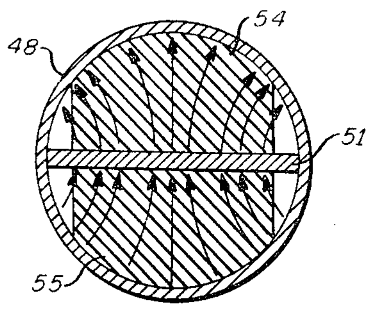
Figure 8D:
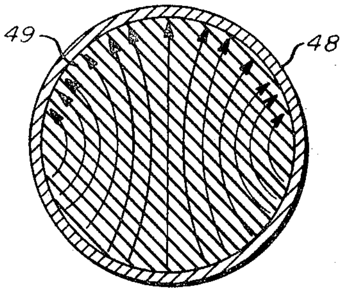

Referring to FIG. 7, coaxial transmission line 43, which consists of concentric inner and outer conductive members 44 and 45 separated by dielectric medium 46, is colinearly aligned along longitudinal axis 47 with circular waveguide 48 formed by an extension of outer conductor 45. Dielectric load 49 preferably has a circular symmetrical cross-section about longitudinal axis 47 such that it completely fills circular waveguide 48. It is not essential, however, for dielectric load 49 either to completely fill the circular waveguide or to have a circular cross-section but it should be symmetrically disposed about the longitudinal axis 47. A microwave transition device, comprising a central conductor strip 50, a septum 51, dielectric members 52 and 53 and dielectric blocks 54 and 55, abuts dielectric load 49 at the septate termination 56. Central conductor strip 50, which forms a colinear extension of inner conductor 45 and connects to septum 51 at the interface 57 between the dielectric members and dielectric blocks, is tapered from a width at interface 57 equal to approximately one-half the diameter of circular waveguide 48 and decreases uniformly throughout its longitudinal dimension to a width equal to the diameter of inner conductor 44 at the junction therewith. The septum 51 has a uniform width throughout its longitudinal dimension equal to the inside diameter of circular waveguide 48. The dielectric members 52 and 53 have a highth contour corresponding to the curvature of the circular waveguide and a width which decreases uniformly from a width equal to that of central conductor strip 50 at interface 57 to a fine edge 58 at the junction of inner conductor 44 with central conductor strip 50 such that they are wedge-shaped. The dielectric blocks 54 and 55 also have a highth contour corresponding to the curvature of the circular waveguide and a width greater than that of the dielectric members at interface 57 and less than the width of septum 51 but uniform throughout their longitudinal dimension. Moreover, the dielectric members and dielectric blocks are disposed symmetrically on each side of the central conductor strip and the septum respectively such that the longitudinal axes of the central conductor strip, septum, dielectric members and dielectric blocks lie in a plane passing through a diameter of circular waveguide 48.

The electric field at section *8a*—*8a* on the unloaded coaxial transmission line forms a TEM mode as shown in FIG. *8a*. The dielectric members which are preferably, but not necessarily, identical in size, shape and dielectric constant provide an impedance match between the coaxial transmission line and the septate portion of the transition device causing the electric field at section *8b*—*8b* to be modified as shown in FIG. *8b* with the power concentrated in the dielectric members. The dielectric blocks have substantially the same size but different dielectric constants so that they asymmetrically load the upper and lower halves of the coaxial transmission line. The length and width of the dielectric blocks and the relative value of their dielectric constants are selected to produce a relative phase shift of 180 degrees between the electric fields propagating in each half of the septate region. As a result the electric fields which were 180 degrees out-of-phase upon entering the septate region are adjusted to be in-phase at section *8c*—*8c* at the termination of the septate region as shown in FIG. *8c*. The septate portion of the microwave transition device also provides an impedance match between the dielectric member section and the dielectrically loaded circular waveguide. When the fields propagate beyond the septate region into the abutting dielectrically loaded waveguide they combine to form the dominant $TE_{11}$ mode configuration of a circular waveguide and have a pattern at section *8d*—*8d* as depicted in FIG. *8d*.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Microwave transition apparatus for transforming a TEM mode propagating in a transmission line having a center conductor to a dominant TE mode for propagation in a dielectrically loaded waveguide, said transition apparatus comprising a first section for asymmetrically loading said transmission line to change the phase of the electric field propagating in one half thereof by 180 degrees relative to the electric field propagating in the other half and a second section operating in conjunction with said first section to provide an impedance match between said transmission line and said waveguide; said first section including a septum formed by a widened extension of said central conductor strip and two dielectric blocks symmetrically disposed opposite one another about said septum and said second section including a central conductor strip and two dielectric members disposed opposite one another about said central conductor strip; the longitudinal axes of said central conductor strip, said dielectric members, said septum, said dielectric blocks and said waveguide lying in a common plane.

2. The apparatus of claim 1 wherein said dielectrically loaded waveguide has a rectangular cross-section, said central conductor strip has a uniform width throughout its longitudinal dimension, said dielectric members are strips of the same shape and dielectric constant, have width less than that of both the central conductor strip and the dielectric load in said dielectrically loaded waveguide, highth equal to that of said dielectric blocks and uniform cross-section throughout their longitudinal their longitudinal dimension, said dielectric blocks are of the same shape, and have width greater than that of both the dielectric strips and the dielectric load in said dielectrically loaded waveguide, highth equal to that of the load in said dielectrically loaded waveguide, unequal dielectric constants and uniform cross-section throughout their longitudinal dimension, and the longitudinal axis of said central conductor strip, said dielectric members, said dielectric blocks and said dielectrically loaded waveguide lie in a plane perpendicular to the broadwalls of said waveguide.

3. The apparatus of claim 2 wherein said dielectric members and said dielectric blocks have rectangular cross-sections, and said septum has a width equal to the dimension between the interior of the sidewalls of said dielectrically loaded waveguide.

4. The apparatus of claim 1 wherein said dielectrically loaded waveguide has a circular cross-section,
siad central conductor strip tapers in width uniformly throughout its longitudinal dimension from a width equal to approximately one-half the width of said septum at the interface of said central conductor strip and said septum to a width approximately equal to that of the center conductor of said transmission line at the junction therewidth,
said dielectric members are wedges of the same shape and dielectric constant, have uniform highth contour corresponding to the curvature of said waveguide throughout their longitudinal dimension and taper in width from the width of said central conductor strip at the interface of said central conductor strip and said septum to a fine edge at the interface of said transmission line and said transition apparatus,
said dielectric blocks are of the same shape and have uniform highth contour corresponding to the curvature of said waveguide throughout their longitudinal dimension, uniform width greater than that of said dielectric members and less than that of said septum throughout their longitudinal dimension and unequal dielectric constants, and
the longitudinal axes of said central conductor strip, said dielectric members, said dielectric blocks and said dielectrically loaded waveguide lie in a plane containing a diameter of said waveguide.

5. The apparatus of claim 4 wherein said septum extends across a diameter of said circular waveguide and said dielectric load completely fills said circular waveguide.

6. Microwave transition apparatus for transforming a TEM mode propagating in a transmission line having a center conductor to a dominant TE mode for propagation in a dielectrically loaded waveguide, said transition apparatus comprising
a first section for asymmetrically loading said transmission line to change the phase of the electric field propagating in one half thereof by 180 degrees relative to the electric field propagating in the other half and a second section operating in conjunction with said first section to provide an impedance match between said transmission line and said waveguide; said first section including a dielectric segment tapered along its longitudinal axis with respect to the top and bottom and side walls of said dielectrically loaded waveguide and a canted extension of said central conductor strip, said canted extension being tapered along its longitudinal axis and slanted in correspondence with the taper of said dielectric segment relative to the top and bottom walls of said dielectrically loaded waveguide; and said second section including a dielectric block having a uniform cross-section through its longitudinal dimension.

7. The apparatus of claim 6 wherein said dielectric segment tapers uniformly throughout its longitudinal dimension,
with respect to the sidewalls of said dielectrically loaded waveguide, from a width equal to that of said dielectric block at the interface of said dielectric block and said dielectric segment to a width equal to that of said central conductor strip at the interface of said central conductor strip and said dielectric segment,
and with respect to the top and bottom walls of said dielectrically loaded waveguide, from a highth equal to that of said dielectric block at the interface of said dielectric block and said dielectric segment to a fine edge at the interface of said central conductor strip and said dielectric segment, said canted extension tapers uniformly throughout its longitudinal dimension with respect to the sidewalls of said dielectrically loaded waveguide from a width equal to that of said central conductor strip at the interface of said central conductor strip and said canted extension to a substantially different width at the interface of said canted extension and said dielectric block, and
said dielectric block has a highth and width equal to the corresponding dimensions of the load in said symmetrically loaded waveguide.

8. The apparatus of claim 7 wherein the canted extension tapers to substantially a point at the interface of said canted extension and said dielectric block.

9. Microwave transition apparatus for transforming a TEM mode propagating in a transmission line having a center conductor to a dominant TE mode for propagation in a dielectrically loaded waveguide, said transition apparatus comprising
a first section for asymmetrically loading said transmission line to change the phase of the electric field propagating in one half thereof by 180 degrees relative to the electric field propagating in the other half and a second section operating in conjunction with said first section to provide an impedance match between said transmission line and said waveguide; said first section including first and second U-shaped subsections having a base and two parallel legs disposed about said center conductor strip such that said center conductor strip is in contact with the interior surface of said base, said first and second U-shaped subsections being mounted in noncontacting relation with the bottom wall of said dielectrically loaded waveguide, said first U-shaped subsection being tapered along its longitudinal dimension with respect to the top, bottom and sidewalls of said dielectrically loaded waveguide and said second U-shaped subsection having a constant cross-section throughout its longitudinal dimension; and said second section including a dielectric member having a slot for accommodating the termination of said center conductor strip, said dielectric member being tapered uniformly throughout its longitudinal dimension with respect to the sidewalls of said dielectrically loaded waveguide and having a constant highth with respect to the top and bottom walls of said dielectrically loaded waveguide.

10. The apparatus of claim 9 wherein said dielectric member tapers with respect to the sidewalls of said dielectrically loaded waveguide from a width equal to that of said second U-shaped subsection at the interface of said second U-shaped subsection and said dielectric member to a width equal to that of the dielectric load at the interface of said dielectric load and said dielectric member,
said first U-shaped subsection tapers with respect to the sidewalls of said dielectrically loaded waveguide from a width equal to that of said second U-shaped subsection at the interface of said first and second U-shaped subsections to a width equal to that of said central conductor strip at the interface of said central conductor strip and said first U-shaped subsection, and
said base of said first U-shaped subsection tapers with respect to the top and bottom walls of said dielectrically loaded waveguide from a highth equal to that of said second U-shaped subsection at the interface of said second U-shaped subsection and said first U-shaped subsection to a fine edge at the interface of said central conductor strip and said first U-shaped subsection.

11. The apparatus of claim 10 wherein the slot in said dielectric member extends across the width thereof on an axis perpendicular to the sidewalls of said dielectrically loaded waveguide and passing through the longitudinal axis thereof, said slot having a concave cylindrical termination to accommodate in abutting relation a convex cylindrical termination of said central conductor strip.

References Cited

UNITED STATES PATENTS

| | | | |
|---|---|---|---|
| 2,619,539 | 11/1952 | Fano | 333—21 |
| 2,943,275 | 6/1960 | Bittner et al. | 333—84 |
| 3,265,995 | 8/1966 | Hamasaki | 333—21 |
| 3,355,683 | 11/1967 | Brown et al. | 333—24.1 XR |

FOREIGN PATENTS

| | | |
|---|---|---|
| 597,251 | 1/1948 | Great Britain. |
| 623,770 | 5/1949 | Great Britain. |

OTHER REFERENCES

"Bandpass Filters Using Strip Line Techniques," Bradley and White, IRE Transactions on Microwave Theory and Techniques, volume MTT–3, March 1955, No. 2, TK 7800, 123, pages 163, 164, 167.

ELI LIEBERMAN, *Primary Examiner.*

MARVIN NUSSBAUM, *Assistant Examiner.*

U.S. Cl. X.R.

333—98